(12) United States Patent
Deng et al.

(10) Patent No.: US 11,119,003 B2
(45) Date of Patent: Sep. 14, 2021

(54) CALIBRATION APPARATUS AND METHOD, AND WAVELENGTH DIVISION MULTIPLEXING SYSTEM

(71) Applicant: Huawei Technologies Co., Ltd., Shenzhen (CN)

(72) Inventors: Binlin Deng, Shenzhen (CN); Lei Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/816,676

(22) Filed: Mar. 12, 2020

(65) Prior Publication Data

US 2020/0209108 A1    Jul. 2, 2020

Related U.S. Application Data

(63) Continuation of application No. PCT/CN2018/109527, filed on Oct. 9, 2018.

(51) Int. Cl.
*H04J 14/02* (2006.01)
*G01M 11/00* (2006.01)
(Continued)

(52) U.S. Cl.
CPC ......... *G01M 11/332* (2013.01); *G02B 6/4246* (2013.01); *G02B 6/4286* (2013.01);
(Continued)

(58) Field of Classification Search
CPC . G01M 11/332; G02B 6/4246; G02B 6/4286; H04B 10/564; H04B 10/66;
(Continued)

(56) References Cited

U.S. PATENT DOCUMENTS 5,978,119 A * 11/1999 Giles .................... H04B 10/506
372/23
6,034,799 A * 3/2000 Hansen ................ H04B 10/506
385/24
(Continued)

FOREIGN PATENT DOCUMENTS

CN        101039149 A        9/2007
CN        102447623 A        5/2012
(Continued)

*Primary Examiner* — Dibson J Sanchez
(74) *Attorney, Agent, or Firm* — Conley Rose, P.C.

(57) ABSTRACT

A calibration apparatus in a wavelength division multiplexing system includes a sending module configured to send a first detection signal to a first multiplexing device; a receiving module configured to receive the first detection signal that passes through the first multiplexing device, and receive a second detection signal that passes through the first multiplexing device and a second multiplexing device; and a processing module configured to adjust a center frequency of the first detection signal, so that an adjusted center frequency of the first detection signal is aligned with a center frequency of the first multiplexing device, and adjust a center frequency of the second detection signal and the center frequency of the first multiplexing device, so that the center frequency of the first multiplexing device is aligned with the center frequency of the second detection signal.

13 Claims, 4 Drawing Sheets

(51) Int. Cl.
*G02B 6/42* (2006.01)
*H04B 10/564* (2013.01)
*H04B 10/66* (2013.01)
*H04B 10/25* (2013.01)

(52) U.S. Cl.
CPC .......... *H04B 10/564* (2013.01); *H04B 10/66* (2013.01); *H04J 14/02* (2013.01); *H04B 10/25* (2013.01)

(58) Field of Classification Search
CPC ...... H04B 10/25; H04B 10/07; H04B 10/572; H04J 14/02; H04J 14/0221
USPC ................................... 398/43–103
See application file for complete search history.

(56) References Cited

U.S. PATENT DOCUMENTS

| | | |
|---|---|---|
| 2005/0078356 A1 | 4/2005 | Kwon et al. |
| 2005/0129402 A1* | 6/2005 | Kim ............... G02B 6/305 398/79 |
| 2005/0175046 A1* | 8/2005 | Khazaei ............ H01S 5/4068 372/29.02 |
| 2005/0213979 A1* | 9/2005 | Nakashima ....... H04B 10/2589 398/79 |
| 2005/0286895 A1* | 12/2005 | Lee ................. H04J 14/0282 398/79 |
| 2006/0115270 A1* | 6/2006 | Kim ............... H04J 14/0246 398/71 |
| 2007/0154216 A1* | 7/2007 | Kim ............... H04J 14/025 398/71 |
| 2008/0089699 A1* | 4/2008 | Li ................. H04B 10/07957 398/197 |
| 2009/0269069 A1 | 10/2009 | Mahgerefteh et al. |
| 2011/0129227 A1* | 6/2011 | Wen ................ H01S 5/0687 398/82 |
| 2012/0195593 A1 | 8/2012 | Bernasconi et al. |
| 2015/0010305 A1* | 1/2015 | Effenberger ....... H04Q 11/0005 398/48 |
| 2015/0341136 A1* | 11/2015 | Chanclou .......... H04J 14/0221 398/67 |
| 2017/0005728 A1* | 1/2017 | Wang ............... H04B 10/272 |
| 2019/0037616 A1 | 1/2019 | Zhang |

FOREIGN PATENT DOCUMENTS

| | | |
|---|---|---|
| CN | 102946282 A | 2/2013 |
| CN | 108029151 A | 5/2018 |
| JP | 2008017002 A | 1/2008 |
| WO | 2012133978 A1 | 10/2012 |

* cited by examiner

CALIBRATION APPARATUS AND METHOD, AND WAVELENGTH DIVISION MULTIPLEXING SYSTEM

CROSS-REFERENCE TO RELATED APPLICATIONS

This application is a continuation of International Patent Application No. PCT/CN2018/109527, filed on Oct. 9, 2018, the disclosure of which is hereby incorporated by reference in its entirety.

TECHNICAL FIELD

This application relates to the field of optical transmission, and more specifically, to a calibration apparatus and method, and a wavelength division multiplexing system.

BACKGROUND

With development of information technologies and future 5th generation (5G) communications technologies, people have increasingly high requirements for high-speed data services and image services, and therefore a bandwidth between a receive end and a transmit end increases particularly rapidly. The extremely rapid bandwidth increase means that more trunk optical cables and distribution optical cables are required for network construction between the receive end and the transmit end.

To resolve a shortage of optical cables in network construction, a wavelength-division multiplexing (WDM) technology may be used. An arrayed waveguide grating (AWG) technology is mainly used to implement optical wave multiplexing and demultiplexing functions, to resolve the problem that more trunk optical cables and distribution optical cables are required for network construction between the receive end and the transmit end. However, in some approaches, when an optical signal passes through an AWG between a receive end and a transmit end, an insertion loss is relatively large, and a requirement of an optical signal loss over a transmission link cannot be met.

Therefore, how to reduce an insertion loss of an optical signal passing through a multiplexing device in an optical signal transmission process to meet the requirement of an optical signal loss over a transmission link becomes an urgent problem to be resolved.

SUMMARY

This application provides a calibration apparatus and method, and a wavelength division multiplexing system, to reduce an insertion loss of an optical signal passing through a multiplexing device in an optical signal transmission process, thereby meeting a requirement of an optical signal loss over a transmission link.

According to a first aspect, a calibration apparatus is provided. The calibration apparatus includes a sending module, a receiving module, and a processing module.

The sending module is configured to send a first detection signal to a first multiplexing device.

The receiving module is configured to receive the first detection signal that passes through the first multiplexing device, and detect a power of the first detection signal that passes through the first multiplexing device.

The processing module is configured to adjust a center frequency of the first detection signal based on a detection result, so that an adjusted center frequency of the first detection signal is aligned with a center frequency of the first multiplexing device.

The sending module is further configured to when the center frequency of the first detection signal is aligned with the center frequency of the first multiplexing device, send a second detection signal to the first multiplexing device and a second multiplexing device, where the center frequency of the first multiplexing device is aligned with a center frequency of the second detection signal.

The receiving module is further configured to receive the second detection signal that passes through the first multiplexing device and the second multiplexing device, and detect a power of the second detection signal that passes through the first multiplexing device and the second multiplexing device.

The processing module is further configured to adjust the center frequency of the second detection signal based on a detection result, so that an adjusted center frequency of the second detection signal is aligned with a center frequency of the second multiplexing device.

In this embodiment of this application, center frequencies of a multiplexer and a demultiplexer in a wavelength division multiplexing system may be aligned. In this way, an insertion loss of an optical signal passing through the multiplexer and the demultiplexer can be reduced in an optical signal transmission process, thereby meeting a requirement of an optical signal loss over a transmission link.

With reference to the first aspect, in some implementations of the first aspect, the processing module is further configured to before the second detection signal is sent to the first multiplexing device and the second multiplexing device, adjust the center frequency of the second detection signal and the center frequency of the first multiplexing device, so that the center frequency of the second detection signal is aligned with the center frequency of the first multiplexing device.

With reference to the first aspect, in some implementations of the first aspect, the calibration apparatus further includes a test access point and a first feedback unit.

The test access point is connected to the first multiplexing device, and configured to split, to the first feedback unit, the first detection signal that passes through the first multiplexing device.

The first feedback unit is connected to the first multiplexing device, and configured to return, to the calibration apparatus, the first detection signal that passes through the first multiplexing device.

In this embodiment of this application, a detection signal is returned to the calibration apparatus along an original path by using the test access point and the first feedback unit, so that the calibration apparatus can adjust a center frequency of the detection signal in a service transmission process in a WDM system, to make a center frequency of a multiplexer and a center frequency of a demultiplexer in the wavelength division multiplexing system aligned.

With reference to the first aspect, in some implementations of the first aspect, the calibration apparatus further includes a second feedback unit.

The second feedback unit is connected to the second multiplexing device, and configured to return, to the calibration apparatus, the second detection signal that passes through the first multiplexing device and the second multiplexing device.

In this embodiment of this application, a detection signal that passes through the first multiplexing device and the second multiplexing device may be returned along an original path by using the second feedback unit, and power detection may be performed. A center frequency of the detection signal is adjusted based on a detected power, so that the center frequency of the detection signal is aligned with the center frequencies of the first multiplexing device and the second multiplexing device. In this way, an insertion loss of an optical signal passing through a multiplexer and a demultiplexer can be reduced in an optical signal transmission process, thereby meeting a requirement of an optical signal loss over a transmission link.

With reference to the first aspect, in some implementations of the first aspect, the first feedback unit or the second feedback unit is a reflection component.

In this embodiment of this application, a detection signal may be returned to the calibration apparatus by using a reflection component, and this is easy to implement.

According to a second aspect, a calibration method is provided. The method includes sending a first detection signal to a first multiplexing device; receiving the first detection signal that passes through the first multiplexing device; detecting a power of the first detection signal that passes through the first multiplexing device, and adjusting a center frequency of the first detection signal based on a detection result, so that an adjusted center frequency of the first detection signal is aligned with a center frequency of the first multiplexing device; when the center frequency of the first detection signal is aligned with the center frequency of the first multiplexing device, sending a second detection signal to the first multiplexing device and a second multiplexing device, where the center frequency of the first multiplexing device is aligned with a center frequency of the second detection signal; receiving the second detection signal that passes through the first multiplexing device and the second multiplexing device; and detecting a power of the second detection signal that passes through the first multiplexing device and the second multiplexing device, and adjusting the center frequency of the second detection signal based on a detection result, so that an adjusted center frequency of the second detection signal is aligned with a center frequency of the second multiplexing device.

With reference to the second aspect, in some implementations of the second aspect, that the center frequency of the first multiplexing device is aligned with a center frequency of the second detection signal includes before the second detection signal is sent to the first multiplexing device and the second multiplexing device, adjusting the center frequency of the second detection signal and the center frequency of the first multiplexing device, so that the center frequency of the second detection signal is aligned with the center frequency of the first multiplexing device.

With reference to the second aspect, in some implementations of the second aspect, the method further includes returning, to a calibration apparatus, the first detection signal that passes through the first multiplexing device.

With reference to the second aspect, in some implementations of the second aspect, the method further includes returning, to the calibration apparatus, the second detection signal that passes through the first multiplexing device and the second multiplexing device.

According to a third aspect, a wavelength division multiplexing system is provided, including a calibration apparatus, a first multiplexing device, and a second multiplexing device.

The first multiplexing device is connected to the calibration apparatus, and the second multiplexing device is disposed at a peer end.

The calibration apparatus is configured to perform the following operations sending a first detection signal to the first multiplexing device; receiving the first detection signal that passes through the first multiplexing device; detecting a power of the first detection signal that passes through the first multiplexing device, and adjusting a center frequency of the first detection signal based on a detection result, so that an adjusted center frequency of the first detection signal is aligned with a center frequency of the first multiplexing device; when the center frequency of the first detection signal is aligned with the center frequency of the first multiplexing device, sending a second detection signal to the first multiplexing device and the second multiplexing device, where the center frequency of the first multiplexing device is aligned with a center frequency of the second detection signal; receiving the second detection signal that passes through the first multiplexing device and the second multiplexing device; and detecting a power of the second detection signal that passes through the first multiplexing device and the second multiplexing device, and adjusting the center frequency of the second detection signal based on a detection result, so that an adjusted center frequency of the second detection signal is aligned with a center frequency of the second multiplexing device.

With reference to the third aspect, in some implementations of the third aspect, the wavelength division multiplexing system further includes a first optical module and a second optical module.

The first optical module is connected to the first multiplexing device, and the second optical module is connected to the second multiplexing device.

The first optical module sends an optical signal to the second optical module; the second optical module detects a power of the received optical signal and sends a power detection result to the first optical module; and the first optical module adjusts a center frequency of the optical signal based on the received power detection result, so that an adjusted center frequency of the optical signal is aligned with the center frequencies of the first multiplexing device and the second multiplexing device.

With reference to the third aspect, in some implementations of the third aspect, the first optical module is connected to the second multiplexing device, and the second optical module is connected to the first multiplexing device.

In this embodiment of this application, a center frequency of a wavelength of a sent optical signal of an optical module may be adjusted, so that the center frequency of the wavelength of the sent optical signal of the optical module is aligned with a center frequency of a multiplexing device (a multiplexer or a demultiplexer). In this way, an insertion loss of an optical signal passing through the multiplexing device can be reduced in an optical signal transmission process, thereby meeting a requirement of an optical signal loss over a transmission link.

With reference to the third aspect, in some implementations of the third aspect, the calibration apparatus further includes a test access point and a first feedback unit.

The test access point is connected to the first multiplexing device, and configured to split, to the first feedback unit, the first detection signal that passes through the first multiplexing device.

The first feedback unit is connected to the first multiplexing device, and configured to return, to the calibration apparatus, the first detection signal that passes through the first multiplexing device.

With reference to the third aspect, in some implementations of the third aspect, the calibration apparatus further includes a second feedback unit.

The second feedback unit is connected to the second multiplexing device, and configured to return, to the calibration apparatus, the second detection signal that passes through the first multiplexing device and the second multiplexing device.

With reference to the third aspect, in some implementations of the third aspect, the first feedback unit or the second feedback unit is a reflection component.

According to a fourth aspect, a computer-readable storage medium is provided, including a computer program. When the computer program is run on a computer or a processor, the computer or the processor is enabled to perform the method according to any one of the second aspect or the implementations of the second aspect.

According to a fifth aspect, a computer program product is provided. When the computer program product is run on a computer or a processor, the computer or the processor is enabled to perform the method according to any one of the second aspect or the implementations of the second aspect.

DESCRIPTION OF EMBODIMENTS

The following describes technical solutions of this application with reference to accompanying drawings.

With development of information technologies and 5G technologies, people have increasingly high requirements for high-speed data services and image services, and therefore a bandwidth between a receive end and a transmit end increases particularly rapidly. The extremely rapid bandwidth increase means that more trunk optical cables and distribution optical cables are required for network construction between the receive end and the transmit end.

Optical fiber communication is widely used by virtue of a large communication capacity, a low transmission loss, good anti-electromagnetic interference performance, low channel crosstalk, good confidentiality, and the like. To resolve a shortage of optical cables in network construction, a WDM or dense wavelength division multiplexing (DWDM) technology may be used. This technology can effectively use a huge bandwidth of an existing optical backbone network, thereby implementing ultra-large capacity transmission, reducing fiber resources usage and line investment, and more effectively meeting requirements of people for the extremely rapid bandwidth increase.

A WDM system may use an optical wave as a carrier, and use optical carriers of different wavelengths to simultaneously transmit signals on several channels on one optical fiber. Each signal obtained through data (such as text, voice, and video) modulation is transmitted within a bandwidth specified for the signal. In this way, a transmission capacity of an optical fiber is greatly increased, and for a given information transmission capacity, a total quantity of required optical fibers can be reduced. Because of cost-effectiveness and effectiveness of a WDM system technology, the WDM system technology becomes a main means of network capacity expansion in optical fiber communication at present.

Figure 1:
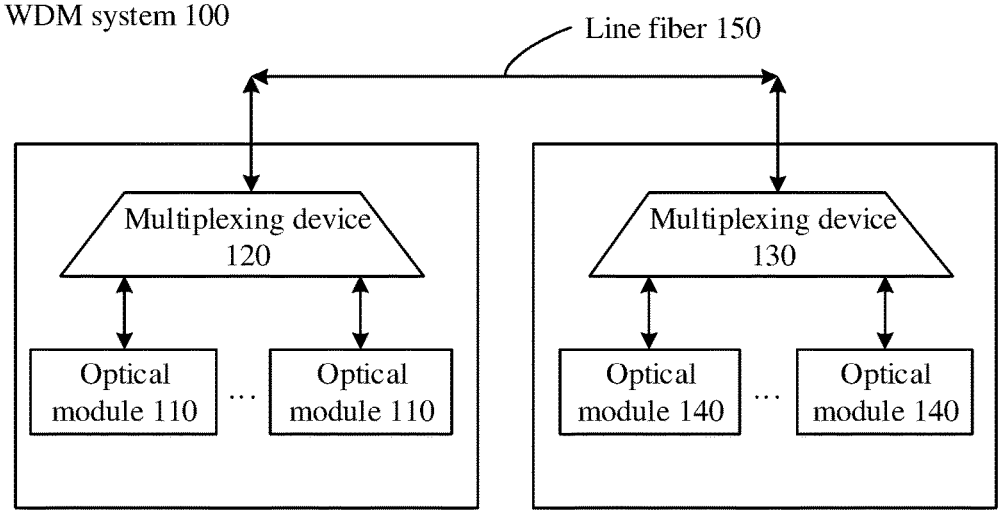
FIG. 1 is a schematic block diagram of a WDM system 100.

FIG. 1 is a schematic block diagram of a WDM system 100. The WDM system 100 may include an optical module 110, a multiplexing device 120, a multiplexing device 130, an optical module 140, and a line fiber 150.

The optical module 110 may, in a sending direction, convert an electrical signal into an optical signal of a single wavelength on each channel for sending.

The optical module 140 may, in a receiving direction, convert the optical signal of a single wavelength into an electrical signal on each channel for receiving.

The multiplexing device 120 may, in the sending direction (for multiplexing), be used as a multiplexer (MUX) 120 to combine (multiplex) optical signals of a single wavelength on all of a plurality of optical fibers onto one optical fiber, and may simultaneously send signals of a plurality of wavelengths through the one optical fiber.

The multiplexing device 130 may, in the receiving direction (for demultiplexing), be used as a demultiplexer (DE-MUX) 130 to divide (demultiplex) the signals of a plurality of wavelengths on the one optical fiber onto a plurality of optical fibers, and may receive optical signals of a single wavelength on all of the plurality of optical fibers.

The following uses arrayed waveguide gratings (AWG) as the multiplexing device 120 and the multiplexing device 130. An operating principle of the WDM system 100 shown in FIG. 1 is described in detail.

The WDM system 100 shown in FIG. 1 may be a bidirectional communications system. The following uses unidirectional communication as an example for description. For example, the multiplexing device 120 may be used as a MUX 120 (a transmit end of an optical signal), and the multiplexing device 130 may be used as a DEMUX 130 (a receive end of an optical signal).

Referring to FIG. 1, n optical modules 110 in the WDM system 100 may convert electrical signals on n channels into optical signals of n wavelengths, and send the optical signals of n wavelengths to n dividing ports of the MUX 120. The MUX 120 combines (multiplexes) the optical signals of n wavelengths received through the n dividing ports onto one optical fiber, and may send the combined optical signals to the line fiber 150 through one combination port of the MUX 120. The combined optical signals may be transmitted to one combination port of the DEMUX 130 through the line fiber 150. The DEMUX 130 may divide (demultiplex) the optical signals of n wavelengths on the one optical fiber onto n optical fibers, and may send the divided optical signals to n optical modules 140 through n dividing ports of the DEMUX 130. The n optical modules 140 may convert optical signals of a single wavelength on n channels into electrical signals for receiving.

However, when the optical signal passes through the WDM system 100, an insertion loss is relatively large, and a requirement of an optical signal loss over a transmission link cannot be met.

An embodiment of this application proposes a calibration apparatus, to align center frequencies of a multiplexer and a demultiplexer in a WDM system. In this way, an insertion loss of an optical signal passing through the multiplexer or the demultiplexer can be reduced, thereby meeting a requirement of an optical signal loss over a transmission link.

Figure 2:
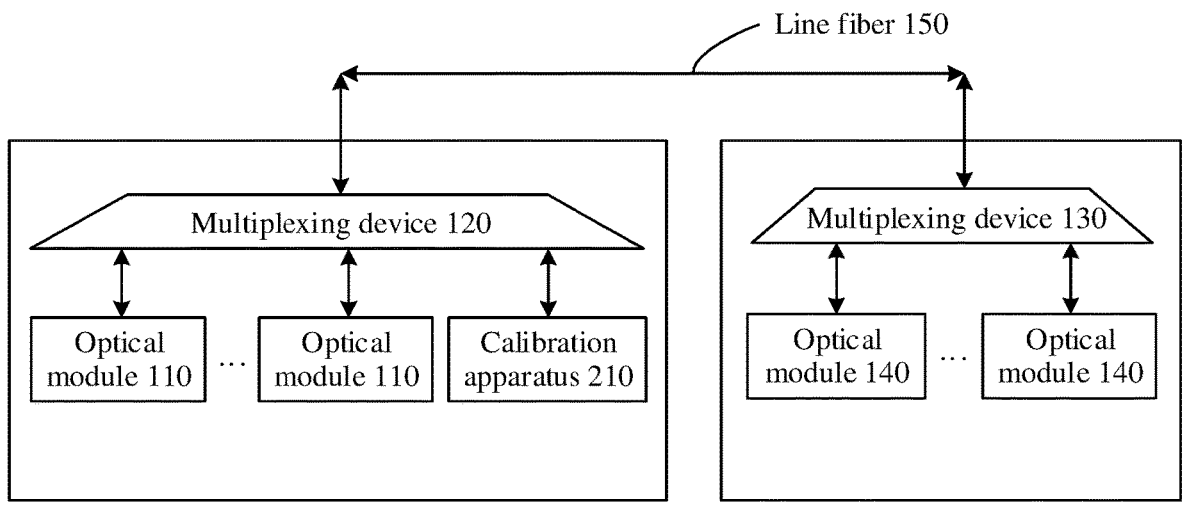
FIG. 2 is a schematic structural diagram of a WDM system 200 according to an embodiment of this application.

With reference to FIG. 2, the following describes in detail a calibration apparatus 210 provided in an embodiment of this application. The calibration apparatus 210 may be applied to a wavelength division multiplexing WDM system 200.

FIG. 2 is a schematic structural diagram of the WDM system 200 according to this embodiment of this application. The WDM system 200 may include an optical module 110, a multiplexing device 120, a multiplexing device 130, an optical module 140, a line fiber 150, and a calibration apparatus 210. Functions of the foregoing modules are described in detail below.

It should be understood that, the WDM system 200 shown in FIG. 2 may include the calibration apparatus 210 in addition to the WDM system 100, to implement alignment between a center frequency of the multiplexing device 120 and a center frequency of the multiplexing device 130.

The optical module 110 and the optical module 140 may be core components for signal transmission and reception. The optical module is not specifically limited in this embodiment of this application, and the optical module may be a single-fiber optical module, or a dual-fiber optical module. For descriptions about the optical module 110, refer to descriptions about FIG. 1, and details are not described herein again.

The multiplexing device 120 or the multiplexing device 130 may be a MUX or a DEMUX. The multiplexing device 120 may be a multiplexing device that supports center frequency adjustment, for example, a thermal AWG, or a multiplexing device that does not support the center frequency adjustment, for example, an athermal AWG. For descriptions about the multiplexing device 120 and the multiplexing device 130, refer to descriptions about FIG. 1, and details are not described herein again.

The line fiber 150 may be a single fiber and implement signal transmission in two directions on the same one optical fiber. The line fiber 150 may alternatively be dual fibers and implement transmission in one direction on one optical fiber, and transmission in a reverse direction on the other optical fiber. This is not specifically limited in this application.

Figure 3:
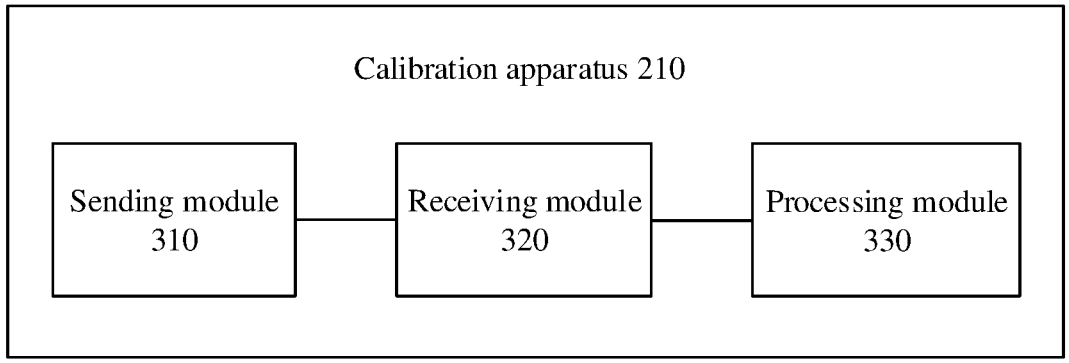
FIG. 3 is a schematic block diagram of a calibration apparatus 210 according to an embodiment of this application.

The calibration apparatus 210 may make adjustment to align a center frequency of a sent detection optical signal with the center frequency of the multiplexing device 120, and when the center frequency of the detection optical signal is aligned with the center frequency of the multiplexing device 120, align a center frequency of a detection optical signal with the center frequency of the multiplexing device 130. In addition, the center frequency of the multiplexing device 120 is synchronously adjusted with the center frequency of the detection optical signal, so that the center frequency of the multiplexing device 120 is finally aligned with the center frequency of the multiplexing device 130. With reference to FIG. 3, the following describes in detail the calibration apparatus 210.

It should be understood that, a multiplexing device has one center frequency. When a frequency of an optical signal that passes through the multiplexing device equals the center frequency of the multiplexing device, an insertion loss of the optical signal passing through the multiplexing device is minimal. Therefore, provided that the frequency of the optical signal can be adjusted to equal (or be aligned with) the center frequency of the multiplexing device, a minimal insertion loss of the optical signal passing through the multiplexing device can be achieved, thereby reducing an insertion loss of the optical signal.

It should be noted that, the added calibration apparatus 210 in the wavelength division multiplexing system 200 shown in FIG. 2 may be integrated with the multiplexing device 120, or physically separated from the multiplexing device 120. This is not specifically limited in this embodiment of this application.

FIG. 3 is a schematic block diagram of a calibration apparatus 210 according to an embodiment of this application. The calibration apparatus 210 shown in FIG. 3 may include a sending module 310, a receiving module 320, and a processing module 330.

With reference to the WDM system 200 shown in FIG. 2, the following describes in detail an operating principle of the calibration apparatus 210 shown in FIG. 3.

It should be understood that the WDM system 200 shown in FIG. 2 may be a bidirectional communications system. For ease of description, the following uses unidirectional communication as an example for description. For example, the multiplexing device 120 may be used as a MUX 120 (a transmit end of an optical signal), and the multiplexing device 130 may be used as a DEMUX 130 (a receive end of an optical signal).

The sending module 310 may send a first detection signal to the multiplexing device 120, and further send a second detection signal to the multiplexing device 130. In addition, the sending module 310 may further change a center frequency or a wavelength of the sent detection signal.

The detection signal sent by the sending module 310 is not specifically limited in this embodiment of this application. For example, the detection signal may have a single wavelength. For another example, the detection signal may have a plurality of wavelengths.

The receiving module 320 may receive the first detection signal that passes through the multiplexing device 120, and detect a power of the first detection signal that passes through the multiplexing device 120. The receiving module 320 may further receive the second detection signal that passes through the multiplexing device 120 and the multiplexing device 130, and detect a power of the second detection optical signal that passes through the multiplexing device 120 and the multiplexing device 130.

The processing module 330 may send the first detection optical signal to the multiplexing device 120, and adjust a center frequency of the first detection optical signal based on the detected power of the first detection signal, until an adjusted center frequency of the first detection signal is aligned with the center frequency of the multiplexing device 120. When the center frequency of the first detection signal is aligned with the center frequency of the multiplexing device 120, similarly, the calibration apparatus 210 sends the second detection optical signal to the multiplexing device 120 and the multiplexing device 130. Based on the detected power of the second detection signal, a center frequency of the second detection signal may be adjusted until the center frequency of the second detection signal is aligned with the center frequency of the multiplexing device 130.

Optionally, in some embodiments, when the center frequency of the first detection signal is aligned with the center frequency of the multiplexing device 120, before the calibration apparatus 210 sends the second detection optical signal to the multiplexing device 120 and the multiplexing device 130, the center frequency of the second detection optical signal may be adjusted, so that the center frequency of the multiplexing device 120 is aligned with the center frequency of the second detection optical signal.

Optionally, in some embodiments, after the second detection optical signal whose center frequency is aligned with the center frequency of the multiplexing device 120 is sent to the multiplexing device 120 and the multiplexing device 130, the power of the second detection optical signal that passes through the multiplexing device 120 and the multiplexing device 130 may be detected. Further, the center frequency of the second detection signal is adjusted based on the detected power of the second detection signal, and the center frequency of the multiplexing device 120 is synchronously adjusted with the center frequency of the second detection signal. After the center frequencies of the multiplexing device 120 and the second detection signal are adjusted, the second detection optical signal with an adjusted center frequency may be sent to the multiplexing device 120 and the multiplexing device 130 again. In addition, a power of the second detection optical signal that passes through the multiplexing device 120 and the multiplexing device 130 is detected, and based on the detected power of the second detection signal, the foregoing adjustment process is repeated until the center frequency of the second detection signal is aligned with the center frequency of the multiplexing device 130, and the center frequency of the multiplexing device 120 is aligned synchronously corresponding to the center frequency of the second detection signal (that is, the center frequency of the multiplexing device 120 is aligned with the center frequency of the multiplexing device 130).

The following uses a process in which the processing module 330 adjusts a center frequency of the detection signal that passes through the multiplexing device 120 as an example for description.

For example, the processing module 330 in the calibration apparatus 210 detects a power of the detection signal that passes through the multiplexing device 120, and changes the center frequency of the detection signal based on the detected power. For example, the center frequency of the detection signal may be increased or reduced, so that the power of the detection signal that passes through the multiplexing device 120 becomes larger. Until a power of the detection signal that passes through the multiplexing device 120 reaches a maximum power or a preset threshold, adjustment of the center frequency of the detection signal may be terminated. In this case, an insertion loss caused after the detection signal sent by the calibration apparatus 210 passes through the multiplexing device 120 is minimal, and the center frequency of the detection signal is aligned with the center frequency of the multiplexing device 120.

It should be noted that the insertion loss may be used to indicate a power loss (a difference between a transmit power and a receive power) of an optical signal. A smaller insertion loss indicates a smaller power loss of the optical signal. Therefore, when a receive power of the detection signal that passes through the multiplexing device 120 reaches a maximum value or a preset threshold, that is, when the receive power is larger, a power loss of the detection signal is smaller, and an insertion loss of the detection signal is smaller. In this embodiment of this application, the insertion loss is a key parameter that affects a transmission distance.

The following describes in detail a process in which the center frequency of the multiplexing device 120 is synchronously adjusted with the center frequency of the detection signal, so that the center frequency of the multiplexing device 120 is finally aligned with the center frequency of the multiplexing device 130.

This embodiment of this application uses an example in which the multiplexing device 120 can support center frequency adjustment. The multiplexing device 120 may adjust the center frequency of the multiplexing device 120 by using temperature. Therefore, in a process in which the center frequency of the detection signal is adjusted to align with the center frequency of the multiplexing device 130, the multiplexing device 120 may control the center frequency of the multiplexing device 120 by using a heating circuit, to make the center frequency of the multiplexing device 120 always aligned with the center frequency of the detection signal. In this way, the center frequency of the multiplexing device 120 can finally be aligned with the center frequency of the multiplexing device 130.

In this embodiment of this application, the calibration apparatus 210 may be added to a WDM system 100, so that alignment between the center frequency of the multiplexing device 120 and the center frequency of the multiplexing device 130 can be implemented, thereby reducing an insertion loss of an optical signal passing through the multiplexing devices, and meeting a requirement of an optical signal loss over a transmission link.

Figure 4:
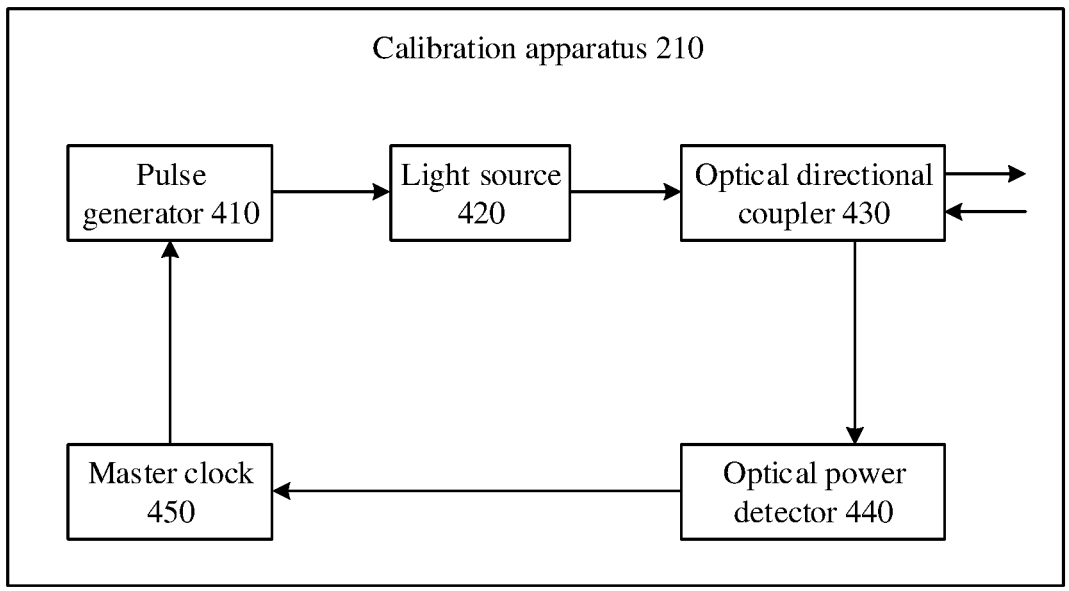
FIG. 4 is a schematic block diagram of a possible calibration apparatus 210 according to an embodiment of this application.

FIG. 4 is a schematic block diagram of a possible calibration apparatus 210 according to an embodiment of this application. The calibration apparatus 210 shown in FIG. 4 may include a pulse generator 410, a light source 420, an optical directional coupler 430, an optical power detector 440, and a master clock 450.

The pulse generator 410 generates a required electrical pulse signal and may send the electrical pulse signal to the light source 420.

The light source 420 may convert the received electrical pulse signal generated by the pulse generator 410 into an optical detection signal, and send the optical detection signal to a fiber line through the optical directional coupler 430.

The pulse generator 410 and the light source 420 may be integrated, for example, the pulse generator 410 and the light source 420 may be a laser or a transmitter. The sending module 310 in FIG. 3 may be a laser or a transmitter, and includes the pulse generator 410 and the light source 420.

The optical directional coupler 430 may output and/or input, in a specific direction, the received optical detection signal sent by the light source 420. Optionally, the sending module 310 in FIG. 3 may further include the optical directional coupler 430, and the receiving module 320 in FIG. 3 may also include the optical directional coupler 430.

The optical power detector 440 may detect a power of a detection signal received from the optical directional coupler 430. The receiving module 320 in FIG. 3 may be implemented by using the optical power detector 440.

The master clock 450 may provide a clock for the pulse generator 410, so that the pulse generator 410 generates a pulse electrical signal at a frequency. That is, the master clock 450 may change a frequency of a detection signal sent to the fiber line. Based on a power detection result sent by the optical power detector 440, the master clock 450 may change the frequency at which the pulse generator 410 generates a pulse electrical signal, that is, change a frequency of a detection signal. The processing module 330 in FIG. 3 may be implemented by using the master clock 450. The processing module 330 in FIG. 3 may be a processor, such as a digital signal processor (DSP) or a field-programmable gate array (FPGA). When stored program code is run, the master clock 450 is controlled to implement a center frequency adjustment function.

After the master clock 450 changes the frequency at which the pulse generator 410 generates the pulse electrical signal, the pulse electrical signal may repeatedly pass through the pulse generator 410, the light source 420, the optical directional coupler 430, and the optical power detector 440. The optical power detector 440 continuously performs detection based on a power of a detection signal that passes through a multiplexing device, and adjust the frequency of the detection signal based on a power detection result, until the center frequency of the detection signal is aligned with a center frequency of the multiplexing device. For descriptions about an implementation of frequency adjustment, refer to descriptions about FIG. 2. Details are not described herein again.

In an embodiment of this application, there are a plurality of implementations in which the calibration apparatus 210 receives a detection signal that passes through the multiplexing device 120 or a detection signal that passes through the multiplexing device 120 and the multiplexing device 130. This is not specifically limited in this embodiment of this application. For example, after the detection signal passes through the multiplexing device 120, a power of the detection signal may be detected, and a center frequency of the detection signal may be adjusted based on the power. For another example, after the detection signal passes through a multiplexing device 120, the detection signal may be split into two signals. In a service transmission process, a service signal of the two signals may normally be sent to the multiplexing device 130 through the line fiber 150, and a detection signal of the two signals may be returned to the calibration apparatus 210 along an original path, for power detection and center frequency adjustment. The following describes in detail this implementation with reference to FIG. 5, and details are not described herein.

Optionally, in some embodiments, after a detection signal passes through the multiplexing device 120, a detection signal obtained through optical splitting may be returned to the calibration apparatus 210 along an original path, for power detection and center frequency adjustment. The calibration apparatus 210 may further include a test access point (TAP) and a feedback unit.

The test access point TAP may be an optical fiber tandem component with a plurality of input ends and a plurality of output ends, and is usually configured for optical signal coupling, splitting, and distribution, to implement optical signal data collection. For example, the detection signal may be split into two signals. In a service transmission process, a service signal of the two signals may normally be sent to the multiplexing device 130 through the line fiber, and a detection signal obtained through splitting may be returned to the calibration apparatus 210 along the original path.

The feedback unit may return the detection signal obtained through splitting performed by the test access point TAP to the calibration apparatus 210 along the original path. The feedback unit is not specifically limited in the embodiments of this application. For example, the feedback unit may be a loop component or a reflection component, and may totally reflect the detection signal obtained through splitting performed by the test access point TAP, so that the detection signal is returned to the calibration apparatus 210 along the original path. For another example, the feedback unit may alternatively be a power detection component. After detecting a power of the detection signal obtained through splitting performed by the test access point TAP, the feedback unit may return the detection signal to the calibration apparatus 210.

In the embodiments of this application, the calibration apparatus 210 may be implemented in a plurality of manners. For example, when the feedback unit is the power detection component, the calibration apparatus 210 may be an optical module, and may be used as a transmit end of an optical signal. For another example, when the feedback unit is the loop component or the reflection component, the calibration apparatus 210 may alternatively send a detection signal to the multiplexing device 120, and detect a power of the detection signal that passes through the multiplexing device. For example, the calibration apparatus may be an optical time domain reflectometer (OTDR). For implementation processes of the feedback unit and the test access point TAP, refer to the following descriptions about FIG. 5. Details are not described herein.

It should be understood that the optical time domain reflectometer OTDR may include an optical transmitter and an optical receiver. The optical transmitter may be configured to transmit an optical detection signal. The optical detection signal is reflected when the optical detection signal reaches an obstacle in a fiber line. The optical receiver may be configured to receive the reflected signal, and determine, based on strength of the reflected signal, a power loss (also referred to as insertion loss) of the optical detection signal passing through an optical fiber link or an element.

In an embodiment of this application, a detection signal that passes through a first multiplexing device and a second multiplexing device may be returned along an original path by using a second feedback unit, and power detection may be performed. A center frequency of the detection signal is adjusted based on a detected power, so that the center frequency of the detection signal is aligned with center frequencies of the first multiplexing device and the second multiplexing device. In this way, an insertion loss of an optical signal passing through a multiplexer and a demultiplexer can be reduced in an optical signal transmission process, thereby meeting a requirement of an optical signal loss over a transmission link.

Optionally, in some embodiments, in addition to aligning the center frequencies of the multiplexing device 120 and the multiplexing device 130, a step of aligning a center frequency of the optical module 110 or a center frequency of the optical module 140 with the center frequencies of the multiplexing device 120 and the multiplexing device 130 may further be added. In this way, an insertion loss can be reduced, thereby meeting a requirement of an optical signal loss over a transmission link. For an implementation of adjusting the center frequency of the optical module 110, refer to the following descriptions about FIG. 5. Details are not described herein.

In an embodiment of this application, a center frequency of a wavelength of a sent optical signal of an optical module may be adjusted, so that the center frequency of the wavelength of the sent optical signal of the optical module is aligned with a center frequency of a multiplexing device (a multiplexer or a demultiplexer). In this way, an insertion loss of an optical signal passing through the multiplexing device can be reduced in an optical signal transmission process, thereby meeting a requirement of an optical signal loss over a transmission link.

Figure 5:
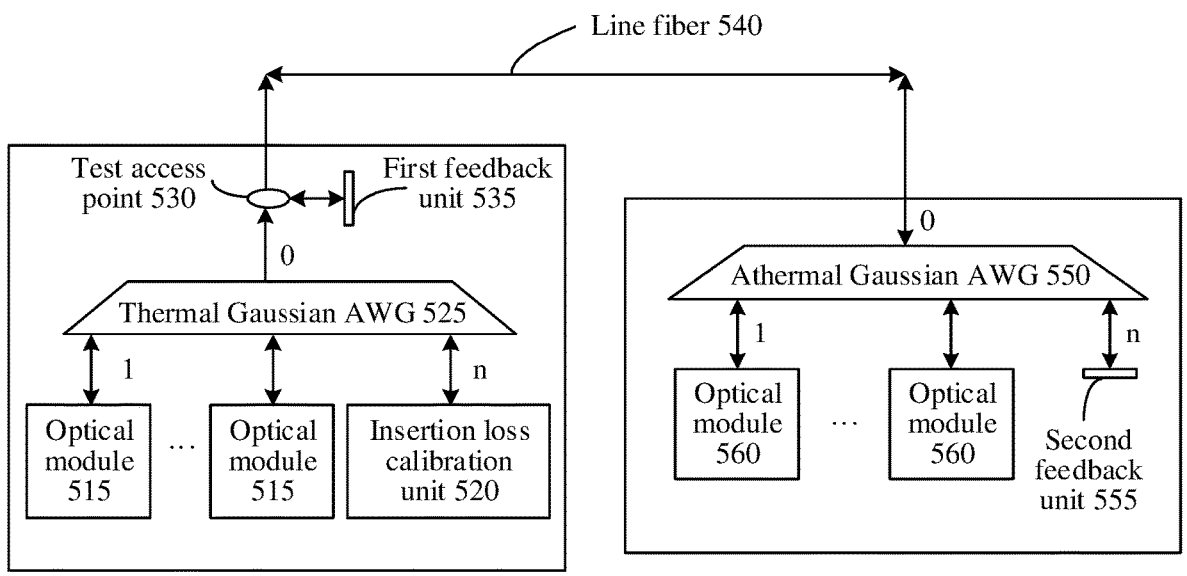
FIG. 5 is a schematic block diagram of a WDM system 500 according to an embodiment of this application.

With reference to FIG. 5, the following describes an implementation of implementing center frequency alignment between the multiplexing devices and between the multiplexing device and the optical module according to this embodiment of this application. It should be noted that the example in FIG. 5 is merely intended to help a person skilled in the art understand the embodiments of this application, instead of limiting the embodiments of this application to a specific value or a specific scenario shown in the examples. A person skilled in the art can perform various equivalent modifications or changes based on the example provided in FIG. 5, and such modifications and changes also fall within the scope of the embodiments of this application.

FIG. 5 is a schematic block diagram of a WDM system 500 according to an embodiment of this application. The WDM system 500 may include an optical module 515, an insertion loss calibration unit 520, a thermal Gaussian AWG 525, a test access point TAP 530, a first feedback unit 535, a line fiber 540, an athermal Gaussian AWG 550, a second feedback unit 555, and an optical module 560.

It should be understood that the WDM system 500 shown in FIG. 5 may be a bidirectional communications system. For ease of description, the following uses unidirectional communication as an example to describe in detail each module of the WDM system 500. For example, a thermal Gaussian AWG 525 side may be used as a transmit end of a signal, and the athermal Gaussian AWG 550 may be used as a receive end of a signal.

The insertion loss calibration unit 520, the first feedback unit 535, and the test access point TAP 530 in FIG. 5 may correspond to the foregoing calibration apparatus 210. The thermal Gaussian AWG 525 may correspond to the foregoing multiplexing device 120, and the athermal Gaussian AWG 550 may correspond to the foregoing multiplexing device 130.

The following describes in detail modules on an optical signal sending side.

The thermal Gaussian AWG 525 may include n dividing ports and one combination port. n optical signals obtained through conversion performed by n optical modules 515 may pass through the n dividing ports, and be multiplexed by the thermal Gaussian AWG 525. The multiplexed optical signals are sent through the one combination port to the athermal Gaussian AWG 550.

The optical module 515 may be located at an input port of the thermal Gaussian AWG 525.

The insertion loss calibration unit 520 may include a single transmitter & receiver (transmitter X & receiver X, TX & RX) integrated port. The insertion loss calibration unit 520 may be located at an input end of the thermal Gaussian AWG 525, and a detection signal sent may enter the thermal Gaussian AWG 525 through an $n^{th}$ port of the thermal Gaussian AWG 525.

It should be noted that, in this embodiment of this application, the insertion loss calibration unit 520 may be integrated with the thermal Gaussian AWG 525, or deployed separately from the thermal Gaussian AWG 525. A specific form of the insertion loss calibration unit 520 is not limited in this embodiment of this application.

The test access point TAP 530 may be located at an output end of the thermal Gaussian AWG 525, and include three ports (for example, one input port and two output ports, or one output port and two input ports).

The first feedback unit 535 may be located at one output port of the test access point TAP 530, and totally reflect an optical signal of the one output port of the test access point TAP 530.

The following describes in detail modules on an optical signal receiving side.

The athermal Gaussian AWG 550 may include n dividing ports and one combination port. n optical modules 560 may receive n optical signals obtained through demultiplexing by using the n dividing ports of the athermal Gaussian AWG 550.

The optical module 560 may be located at an output port of the athermal Gaussian AWG 550.

The second feedback unit 555 may be located at an output end of the athermal Gaussian AWG 550, and totally reflect an optical signal of an $n^{th}$ output port of the athermal Gaussian AWG 550.

The WDM system 500 shown in FIG. 5 can be used to align center frequencies of the thermal Gaussian AWG 525 and the athermal Gaussian AWG 550, and align center frequencies of the optical module 515 and the optical module 560 with the center frequencies of the thermal Gaussian AWG 525 and the athermal Gaussian AWG 550.

First, the following describes an implementation of aligning a center frequency of the detection signal sent by the insertion loss calibration unit 520 with the center frequency of the thermal Gaussian AWG 525.

The TX & RX integrated port of the insertion loss calibration unit 520 sends the detection signal to the thermal Gaussian AWG 525, where the detection signal enters the thermal Gaussian AWG 525 through the $n^{th}$ port of the thermal Gaussian AWG 525. After being multiplexed by the thermal Gaussian AWG 525, the detection signal output by a port 0 of the thermal Gaussian AWG 525 may be split into two signals by the test access point TAP 530. In a service transmission process, a service signal of the two signals may normally be sent to the athermal Gaussian AWG 550 along the line fiber 540, and a detection signal obtained through splitting may be sent to the first feedback unit 535. The first feedback unit 535 may totally reflect the detection signal, and return the detection signal to the $n^{th}$ port of the thermal Gaussian AWG 525 along an original path. The TX & RX integrated port of the insertion loss calibration unit 520 processes the detection signal received from the $n^{th}$ port of the thermal Gaussian AWG 525.

The insertion loss calibration unit 520 may detect a power of the detection signal that passes through the thermal Gaussian AWG 525, and adjust the center frequency of the detection signal based on a detection result. For descriptions about a process of adjusting the center frequency of the detection signal, refer to descriptions about FIG. 2. Details are not described herein again.

Second, an implementation of aligning the center frequency of the thermal Gaussian AWG 525 with the center frequency of the athermal Gaussian AWG 550 is described.

The TX & RX integrated port of the insertion loss calibration unit 520 may send a detection signal with a center frequency aligned with the center frequency of the thermal Gaussian AWG 525. The detection signal may pass through the thermal Gaussian AWG 525 and the line fiber 540, and enter the athermal Gaussian AWG 550 through a port 0 of the athermal Gaussian AWG 550. After being demultiplexed by the athermal Gaussian AWG 550, the detection signal is output from the $n^{th}$ port of the athermal Gaussian AWG 550. The second feedback unit 555 may totally reflect the detection signal received from the $n^{th}$ port of the athermal Gaussian AWG 550, and return the detection signal along an original path to the TX & RX integrated port of the insertion loss calibration unit. The insertion loss calibration unit 520 processes the detection signal that passes through the thermal Gaussian AWG 525 and the athermal Gaussian AWG 550.

The insertion loss calibration unit 520 may detect a power of the detection signal that passes through the thermal Gaussian AWG 525 and the athermal Gaussian AWG 550, and adjust the center frequency of the detection signal based on a detection result. In addition, the center frequency of the thermal Gaussian AWG 525 that is aligned with the center frequency of the detection signal is synchronously adjusted with the center frequency of the detection signal sent by the insertion loss calibration unit 520 (for example, the center frequency of the thermal Gaussian AWG 525 may be adjusted by temperature adjustment, so that the center frequency of the thermal Gaussian AWG 525 is always aligned with the center frequency of the detection signal sent by the insertion loss calibration unit 520). The center frequency of the thermal Gaussian AWG 525 is aligned with the center frequency of the detection signal, and the center frequency of the detection signal is aligned with the center frequency of the athermal Gaussian AWG 550. Therefore, alignment between the center frequency of the thermal Gaussian AWG 525 and the center frequency of the athermal Gaussian AWG 550 can be implemented. For descriptions about processes of adjusting the center frequency of the detection signal and adjusting the thermal Gaussian AWG 525 synchronously corresponding to the center frequency of the detection signal, refer to descriptions about FIG. 2. Details are not described herein again.

Finally, by using the optical module 515 as a transmit end of an optical signal, an implementation of adjusting a center frequency of an optical signal sent by the optical module 515 to align the center frequency of the optical signal sent by the optical module 515 with the center frequencies of the thermal Gaussian AWG 525 and the athermal Gaussian AWG 550 is described.

A transmit end (transmitter, TX) of the optical module 515 sends the optical signal, and a receive end (receiver, RX) of the optical module 560 receives the optical signal. The optical module 515 may make fine adjustment to the center frequency of the optical signal sent by the optical module 515. In addition, the optical module 560 rapidly detects a power of the optical signal received by the optical module 560, and feeds back a power detection result to the optical module 515. Based on the power detection result, the optical module 515 may adjust the center frequency of the optical signal sent by the optical module 515. When the optical module 560 detects that the received optical signal has a maximum receive power, the optical module 560 may send a notification message to the optical module 515, and the optical module 560 may instruct the optical module 515 to stop adjusting the center frequency of the sent optical signal. In this case, the center frequency of the optical signal sent by the optical module 515 is aligned with the center frequencies of the thermal Gaussian AWG 525 and the athermal Gaussian AWG 550.

Optionally, in some embodiments, the optical module 560 may be used as a transmit end of an optical signal, and the optical module 515 may be used as a receive end of an optical signal. The following uses the optical module 560 as a transmit end of an optical signal, to describe a process of adjusting a center frequency of an optical signal sent by the optical module 560 to align the center frequency of the optical signal sent by the optical module 560 with the center frequencies of the thermal Gaussian AWG 525 and the athermal Gaussian AWG 550.

A TX of the optical module 560 sends the optical signal and an RX of the optical module 515 receives the optical signal. The optical module 560 may make fine adjustment to the center frequency of the optical signal sent by the optical module 560. In addition, the optical module 515 rapidly detects a power of the optical signal received by the optical module 515. When the optical module 515 detects that the received optical signal has a maximum receive power, the optical module 515 may send a notification message to the optical module 560, and the optical module 515 may instruct the optical module 560 to stop adjusting the center frequency of the sent optical signal. In this case, the center frequency of the optical signal sent by the optical module 560 is aligned with the center frequencies of the thermal Gaussian AWG 525 and the athermal Gaussian AWG 550.

It should be noted that the center frequency of the optical signal sent by the optical module 515 may first be adjusted, or the center frequency of the optical signal sent by the optical module 560 may first be adjusted. This is not specifically limited in the embodiments of this application.

Optionally, in some embodiments, the WDM system may adjust a center frequency of an optical signal or a center frequency of a detection signal at a high speed.

When an optical signal passes through a multiplexing device, before the WDM system provided in this embodiment of this application is used, an insertion loss of the optical signal is 6 dB; after the WDM system provided in this embodiment of this application is used, the insertion loss of the optical signal is 3.5 dB. The insertion loss is reduced by about 40%. Before the WDM system provided in this embodiment of this application is used, a power of the optical signal over a transmission link is 8 dB; after the WDM system provided in this embodiment of this application is used, the power of the optical signal in the transmission link is 12 dB. A power budget of the transmission link is increased by 50%.

Therefore, the WDM system provided in this embodiment of this application can be used to reduce an insertion loss of an optical signal passing through a multiplexing device in an optical signal transmission process, thereby meeting a requirement of an optical signal loss over a transmission link.

Figure 6:
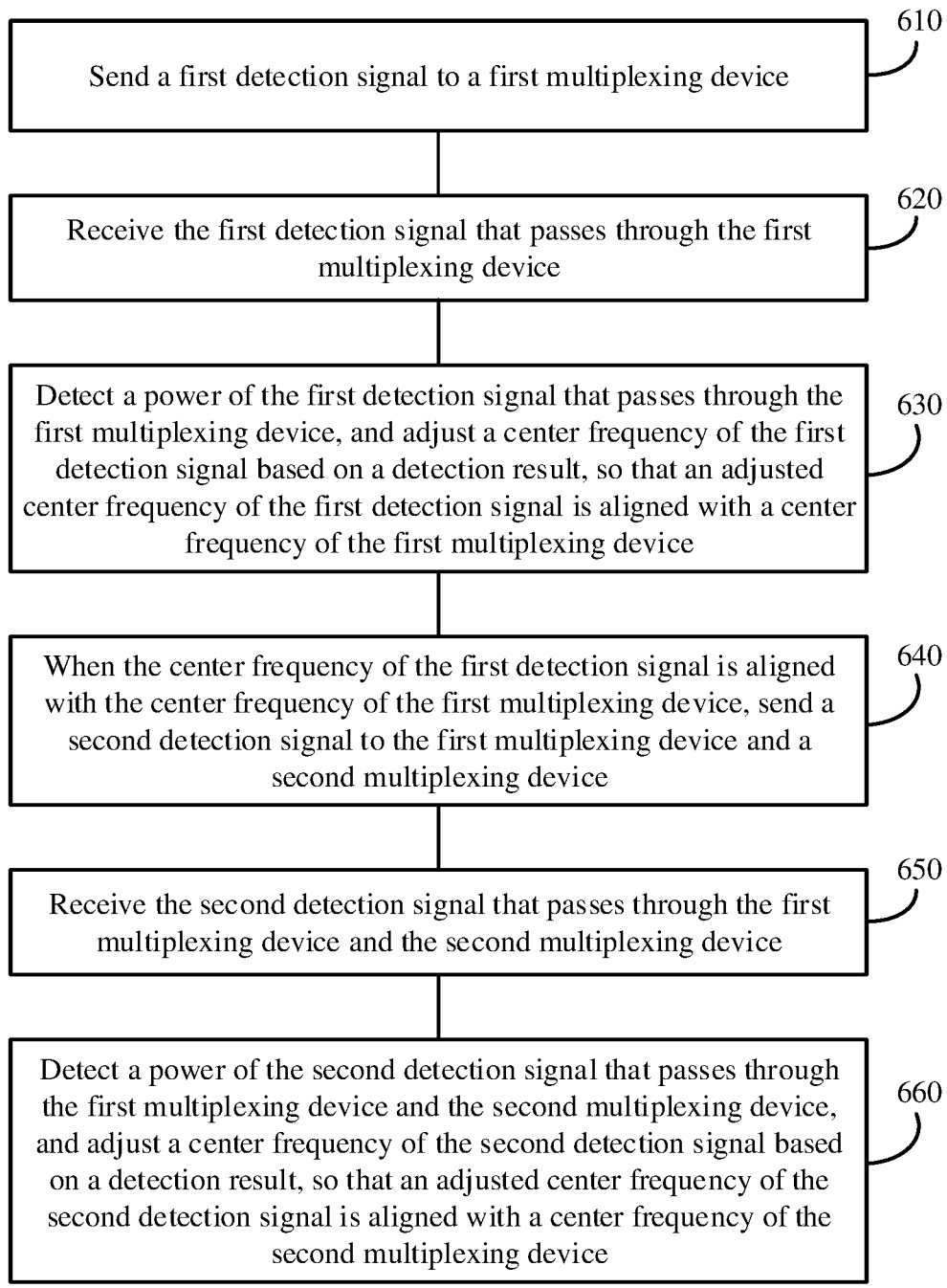
FIG. 6 is a schematic flowchart of a calibration method according to an embodiment of this application.

With reference to FIG. 1 to FIG. 5, the foregoing describes in detail the calibration apparatus provided in the embodiments of the present application. With reference to FIG. 6, the following describes in detail a calibration method provided in an embodiment of this application.

FIG. 6 is a schematic flowchart of a calibration method according to an embodiment of this application. The method includes step 610 to step 660. The following describes step 610 to step 660 in detail.

Step 610, send a first detection signal to a first multiplexing device.

Step 620, receive the first detection signal that passes through the first multiplexing device.

Step 630, detect a power of the first detection signal that passes through the first multiplexing device, and adjust a center frequency of the first detection signal based on a detection result, so that an adjusted center frequency of the first detection signal is aligned with a center frequency of the first multiplexing device.

Step 640, when the center frequency of the first detection signal is aligned with the center frequency of the first multiplexing device, send a second detection signal to the first multiplexing device and a second multiplexing device, where a center frequency of the second detection signal is aligned with the center frequency of the first multiplexing device.

Step 650, receive the second detection signal that passes through the first multiplexing device and the second multiplexing device.

Step 660, detect a power of the second detection signal that passes through the first multiplexing device and the second multiplexing device, and adjust the center frequency of the second detection signal based on a detection result, so that an adjusted center frequency of the second detection signal is aligned with a center frequency of the second multiplexing device.

It should be understood that descriptions of the method embodiment correspond to descriptions of the apparatus embodiments. Therefore, for parts that are not described in detail, refer to the foregoing apparatus embodiments. Details are not described herein again.

By using the calibration method provided in this embodiment of this application, center frequencies of a multiplexer and a demultiplexer in a wavelength division multiplexing system can be aligned. In this way, an insertion loss of an optical signal passing through the multiplexer and the demultiplexer can be reduced in an optical signal transmission process, thereby meeting a requirement of an optical signal loss over a transmission link.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

Terminologies such as "component", "module", and "system" used in this specification are used to indicate terminal-device-related entities, hardware, firmware, combinations of hardware and software, software, or software being executed. It should be understood that division of manners, cases, types, and embodiments in the embodiments of this application are only for ease of description, but should not constitute any special limitation, and features in various manners, types, cases, and embodiments may be combined when there is no contradiction.

It should be further understood that "first", "second", and "third" in the embodiments of this application are merely intended to distinguish between each other, and should not be construed as any limitation on this application. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It should be noted that the term "and/or" describes an association relationship for describing associated objects and represents that three relationships may exist. For example, A and/or B may represent the following three cases, only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases, only A exists, both A and B exist, and only B exists. The following describes in detail the technical solutions provided in this application with reference to the accompanying drawings.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

When the functions are implemented in the form of a software functional unit and sold or used as an independent product, the functions may be stored in a computer-readable storage medium. Based on such an understanding, the technical solutions of this application may be implemented in a form of a software product. The software product is stored in a storage medium, and includes several instructions for instructing a computer device (which may be a personal computer, a server, or a device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are various implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A calibration method comprising:
sending, by a transmitter, a first detection signal to a first multiplexing device, wherein the transmitter includes a pulse generator and a light source, wherein the light source converts a first electrical pulse signal generated by the pulse generator into the first detection signal;
receiving, by an optical power detector, the first detection signal after the first detection signal passes through the first multiplexing device;
detecting a first power of the first detection signal after the first detection signal passes through the first multiplexing device;
adjusting, based on a first detection a first center frequency of the first detection signal result by a master clock adjusting the frequency of the first electrical pulse signal, wherein a first adjusted center frequency of the first detection signal is aligned with a second center frequency of the first multiplexing device;

sending, by the transmitter, a second detection signal to the first multiplexing device and a second multiplexing device when the first center frequency is aligned with the second center frequency, wherein the second center frequency is aligned with a third center frequency of the second detection signal, and wherein the light source converts a second electrical pulse signal generated by the pulse generator into the second detection signal;

receiving, by the optical power detector, the second detection signal after the second detection signal passes through the first multiplexing device and the second multiplexing device;

detecting, by the optical power detector, a second power of the second detection signal after the second detection signal passes through the first multiplexing device and the second multiplexing device;

adjusting the third center frequency based on a second detection result by a master clock adjusting the frequency of the second electrical pulse signal, wherein a second adjusted center frequency of the second detection signal is aligned with a fourth center frequency of the second multiplexing device; and adjusting the second center frequency of the first multiplexing device based on the adjusted third center frequency of the second detection signal by temperature adjustment.

2. The method of claim 1, further comprising, before the second detection signal is sent, adjusting the third center frequency and the second center frequency, wherein the third center frequency is aligned with the second center frequency.

3. The method of claim 1, further comprising returning the first detection signal after the first detection signal passes through the first multiplexing device.

4. The method of claim 1, further comprising returning the second detection signal after the second detection signal passes through the first multiplexing device and the second multiplexing device.

5. The method of claim 1, wherein the first detection signal comprises only a single wavelength.

6. A wavelength division multiplexing system comprising:
a first multiplexing device connected to a calibration apparatus comprising an optical power detector, a master clock, and a transmitter including a pulse generator and a light source; and
a second multiplexing device disposed at a peer end,
wherein the transmitter is configured to send a first detection signal to the first multiplexing device, wherein the light source converts an first electrical pulse signal generated by the pulse generator into the first detection signal;
wherein the optical power detector is configured to:
receive the first detection signal after the first detection signal passes through the first multiplexing device; and
detect a first power of the first detection signal after the first detection signal passes through the first multiplexing device;
wherein the master clock is configured to adjust a first center frequency of the first detection signal based on a first detection result by adjusting the frequency of the first electrical pulse signal, wherein a first adjusted center frequency of the first detection signal is aligned with a second center frequency of the first multiplexing device;

wherein the transmitter is further configured to send a second detection signal to the first multiplexing device and the second multiplexing device when the first center frequency is aligned with the second center frequency, wherein the second center frequency is aligned with a third center frequency of the second detection signal;

wherein the optical power detector is further configured to:
receive the second detection signal after the second detection signal passes through the first multiplexing device and the second multiplexing device; and
detect a second power of the second detection signal after the second detection signal passes through the first multiplexing device and the second multiplexing device; and wherein the master clock is further configured to adjust the third center frequency based on a second detection result by adjusting the frequency of the second electrical pulse signal, wherein a second adjusted center frequency of the second detection signal is aligned with a fourth center frequency of the second multiplexing device, and wherein the first multiplexing device is configured to adjust the second center frequency based on the adjusted third center frequency of the second detection signal by temperature adjustment.

7. The wavelength division multiplexing system of claim 6, wherein the calibration apparatus is further configured to, before the second detection signal is sent, adjust the third center frequency and the second center frequency, wherein the third center frequency is aligned with the second center frequency.

8. The wavelength division multiplexing system of claim 6, further comprising:
a first optical module coupled to the first multiplexing device; and
a second optical module coupled to the second multiplexing device,
wherein the first optical module sends an optical signal to the second optical module, wherein the second optical module detects a third power of the optical signal and sends a power detection result to the first optical module, wherein the first optical module adjusts a fifth center frequency of the optical signal based on the power detection result, and wherein a third adjusted center frequency of the optical signal is aligned with a fifth center frequency of the first multiplexing device and a sixth center frequency of the second multiplexing device.

9. The wavelength division multiplexing system of claim 6, wherein
the calibration apparatus further comprises:
a splitter coupled to the first multiplexing device, the splitter configured to split, to a first feedback component, the first detection signal after the first detection signal passes through the first multiplexing device; and
the first feedback component coupled to the first multiplexing device, the first feedback component configured to return, to a receiver of the calibration apparatus, the first detection signal after the first detection signal passes through the first multiplexing device.

10. The wavelength division multiplexing system of claim 9, wherein the receiver comprises a second feedback component coupled to the second multiplexing device, the second feedback component configured to return, to the calibration apparatus, the second detection signal after the second detection signal passes through the first multiplexing device and the second multiplexing device.

11. The wavelength division multiplexing system of claim 10, wherein the first feedback component is a reflection component.

12. The wavelength division multiplexing system of claim 10, wherein the second feedback component is a reflection component.

13. The wavelength division multiplexing system of claim 6, wherein the first detection signal comprises only a single wavelength.

\* \* \* \* \*